United States Patent [19]

Gala et al.

[11] Patent Number: 4,617,428
[45] Date of Patent: Oct. 14, 1986

[54] TELEPHONE BASE ADAPTED TO FACILITATE BOTH DESK AND WALL MOUNTING OF TELEPHONE INSTRUMENT

[75] Inventors: Babulal V. Gala; Gerald B. McGough, both of Huntsville, Ala.

[73] Assignee: GTE Communication Systems Corp., Northlake, Ill.

[21] Appl. No.: 659,398

[22] Filed: Oct. 10, 1984

[51] Int. Cl.[4] ............................................. H04M 1/02
[52] U.S. Cl. ............................. 179/100 C; 179/100 R
[58] Field of Search ........... 179/100 C, 100 R, 100 D, 179/146 R, 178, 179

[56] References Cited

U.S. PATENT DOCUMENTS

| | | | |
|---|---|---|---|
| 3,898,394 | 8/1975 | Ward et al. | 179/146 R |
| 4,284,855 | 8/1981 | Adams et al. | 179/100 C |
| 4,349,706 | 9/1982 | Thompson | 179/100 C |
| 4,491,696 | 1/1985 | Haskins et al. | 179/100 C |
| 4,515,998 | 5/1985 | Pinede et al. | 179/146 R |

OTHER PUBLICATIONS

*Telephony*, vol. 194, May 22, 1978, pp. 26-27.

*Primary Examiner*—Thomas W. Brown
*Assistant Examiner*—R. Vaas
*Attorney, Agent, or Firm*—Robert J. Black

[57] ABSTRACT

An adaptor base for a telephone instrument that facilitates the instrument's use in both desk and wall mounted modes. Simplified construction allows the telephone user to reposition the base from one position to another, and even back to the first position if desired. The adaptor base is also so designed that the base and associated telephone can be mounted on a standard jack for a wall mounted telephone.

15 Claims, 4 Drawing Figures

TELEPHONE BASE ADAPTED TO FACILITATE BOTH DESK AND WALL MOUNTING OF TELEPHONE INSTRUMENT

BACKGROUND OF THE INVENTION

1. Field of the Invention

The present invention relates in general to telephones and more particularly to a base for a telephone instrument which facilitates its being used as a desk mounted or wall mounted instrument.

2. BACKGROUND ART

In the past telephones have been designed with the inclusion of means whereby the support or mounting for the hand telephone may be adapted for use either upon a desk or upon a wall. Such telephones usually required special modification of the standard hook switch as well as the cradle portion of the telephone to readily facilitate its use in both horizontal and vertical modes. The use of telephones so modified has been taught by U.S. Pat. Nos. 2,558,699; 2,277,280; 2,277,296; 2,492,375 and 2,654,811. An examination of the designs taught by the aforementioned patents indicates that they are all compromise designs and as such function less than ideally in both horizontal and vertical modes.

Another approach to the adaptation of conventional telephone instruments for use in both horizontal and vertical modes is taught by U.S. Pat. No. 3,480,741 which teaches in effect an attachment that will secure and optimally support a traditional desk type telephone in a vertical position. The support assembly includes a number of inclined arms upon which the base of the telephone can rest in an inclined but generally horizontal position with the base support assembly being mounted in a vertical position on the wall. A modification also for holding the telephone hand set is included as part of the support structure which is articulated in a manner so as to engage the hook switch buttons of the traditional desk type telephone. While the unit appears to be operatively effective, its appearance is less than aesthetically pleasing.

Another recent factor entering into the difficulties of utilizing the same telephone for both horizontal and vertical mounting is the provision of permanently installed outlets which facilitate the telephone subscriber merely plugging into a convenient outlet with a plug attached to the telephone instrument. Clearly such arrangements are adapted for either wall mounting or desk mounting of telephones but not for a combination of both. Most recently, under federal law, telephone company regulations have been modified so that now it is necessary for the telephone subscriber to purchase in most instances his own telephone connecting it to existing terminals or to terminals which must be installed. If, of course, the terminal, i.e. jacks, are already installed no installation service visit is required by local telephone company operating personnel.

In this situation there are severe technical problems. Wall terminals (jacks) normally are of the female type and include a plurality of openings into which male plugs are inserted when a set is installed. They provide the necessary electrical interface between the telephone line and the telephone instrument. In order to facilitate wall mounting of a telephone set and electrical connection by an unskilled person, a telephone set adapted to include a rear plate having a stationary electrical male plug and facilities for being connected to the wall unit mechanically to provide the structural support is usually provided. Alternatively, desk mounted telephones are equipped with a cord and plug which extends some distance from the desk or similar location to a wall mounted jack usually located somewhere near the baseboard rather than higher up on an associated wall.

To facilitate wall mounting by the subscriber of many standard wall type telephone instruments a number of adaptor assemblies have been provided which facilitate the customer's direct location of wall telephones on wall mounted jacks. Such assemblies are taught by U.S. Pat. Nos. 3,840,711; 3,848,097; 3,849,608; 3,851,119 and 3,898,394. These adaptor units while readily facilitating the mounting of wall type telephones are only useful for such wall telephones and cannot be utilized in adapting desk mounted telephones to be located in a vertical position.

Accordingly there is need for an adaptor which can function in combination with a desk telephone design in the desk mode and yet be readily adapted to facilitate the mounting of a telephone instrument flush against a vertical wall by the telephone subscriber.

SUMMARY OF THE INVENTION

The present invention provides a base for a desk mounted telephone set which facilitates the use of a desk telephone in a conventional mode wherein a line cord extends from the telephone instrument to a standard wall jack adapted to accept a standard plug attached to the line cord to provide the necessary electrical interface between the telephone and the subscriber's telephone line. The base may be readily removed by the subscriber and then reversed and in such a manner permit the previously horizontal desk mounted telephone to be relocated in a vertical position flush against a vertical wall and adapted to engage a wall mounted jack adapted for supporting a wall mounting telephone. The adaptor base includes therein openings and locking means for establishing the necessary support connection for the telephone and also includes means to accommodate surplus line cord length inside the adaptor base in such a way that the terminating plug thereon may be inserted into the wall mounting jack.

The adaptor base unit of the present invention consists of a hollow wedge shaped unit having solid walls on five sides thereof with the sixth side facing the associated telephone instrument, being open. The wedge has formed thereon provision for a plurality of openings in the bottom of the desk telephone instrument. In the normal horizontal mode of operation the thickest portion of the wedge is positioned near the back portion of the telephone and has the effect of tilting the telephone slightly forward from the horizontal toward the user, facilitating its use in the desk mounted position. Included in the adaptor base which normally would be made of plastic or similar material, is a raceway which encloses and supports the telephone line cord directing it from its connection at the telephone to a location external to the telephone base, after which it may be plugged into a typical wall mounted jack.

The design of the adaptor base includes a channel or wall portion which directs the cord to the raceway and facilitates the user's insertion of the cord in the raceway or removal therefrom when it is desirable to change the mode of operation of the telephone from that of a desk unit to a wall mounted unit. Also included in the unit are a number of ridges which strengthen the structure of the external wall portion of the adaptor unit.

To modify a telephone instrument adapted for use with the adaptor base with the present invention, the subscriber removes the base by unsnapping the flexible snap connector of the base from its mated opening in the telephone bottom and rotating the base 180° toward the user so that the thickest portion is toward the front of the telephone. At this point the connectors will be engaged into the appropriate openings in the telephone bottom which are aligned for vertical placement and the unit may now be mounted on a telephone wall jack by means of the openings contained in the wall of the adaptor base which will receive studs normally associated with standard wall mounting telephone jacks. Also enclosed in the base is a locking means which, once the telephone has been placed on the studs associated with the wall jack, locks the telephone adaptor base and the associated telephone to the wall preventing it from being accidently knocked off of its appropriate location.

Before the adaptor base is secured to the telephone, however the line cord extending from the telephone bottom itself may have much of its length wrapped around two posts included within the adaptor base to eliminate the superfluous amount of line cord available. The end of the line cord then with the jack may be brought out through the wall portion of the adaptor base by removal of a centrally located panel which is designed for ready removal by the subscriber. With most of the cord wrapped around the supporting posts and the jack portion available in the center of the telephone the base now may be engaged with the telephone, the jack plugged into the wall mounting telephone jack and the base adaptor unit secured to the studs that are a part of standard wall telephone mounting jacks, after which the locking mechanism is engaged to retain the now vertically mounted telephone in that position. It should be noted that of necessity any telephone so mounted in addition to having the appropriate openings in its bottom, to receive the adaptor base, the telephone invention must also have a hook switch and handset retaining means adapted for use in both horizontal and vertical positions. Such units are well known and are exemplified by telephones such as the "GAMMA" telephone manufactured by GTE Communication Systems Corporation.

DESCRIPTION OF THE PREFERRED EMBODIMENT

Figure 1:
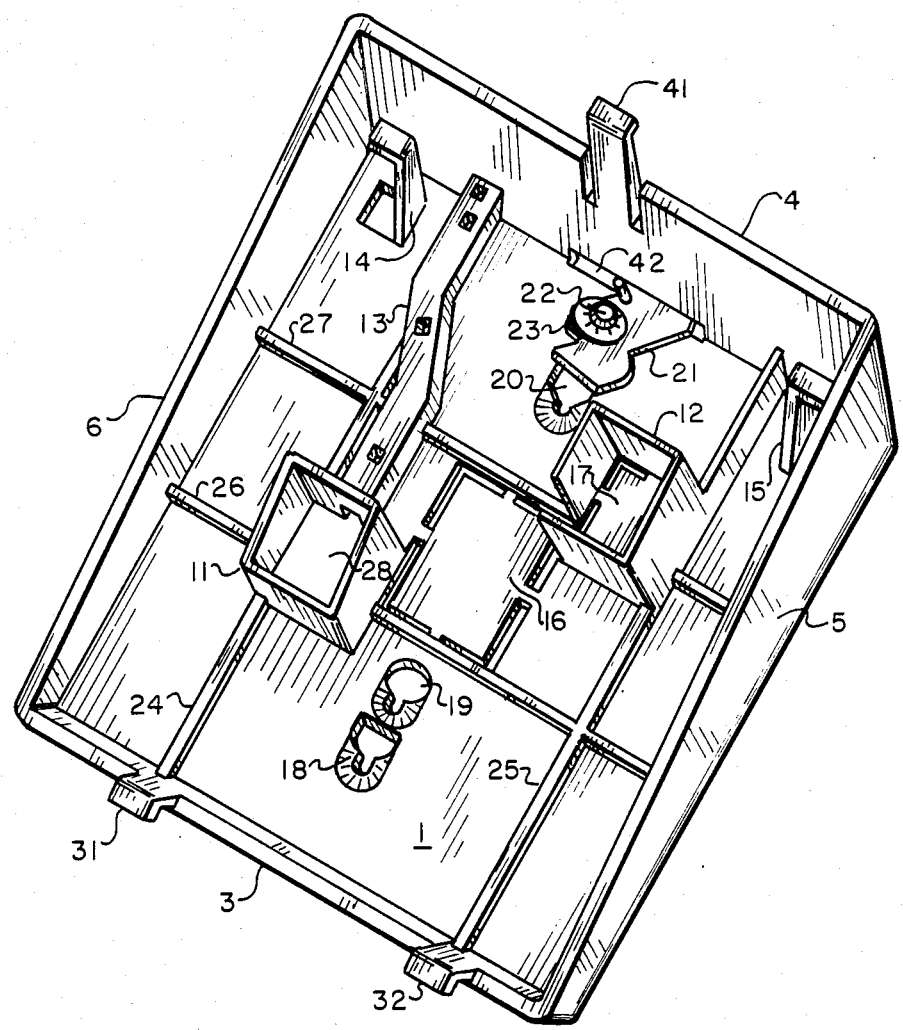
FIG. 1 is a perspective view of an adaptor base unit in accordance with the present invention showing the internal construction of said base.

Referring now to FIG. 1 the adaptor unit of the present invention is shown with particular reference to the internal portions thereof The unit consists of bottom floor 1 surrounded by four walls 3, 4, 5 and 6. Wall 3 is of minimal elevation while wall 4 presents maximum elevation. Walls 5 and 6 being trapazoidal in form, having their small end connecting to end 3, and their large end meeting with wall 4. Wall 4 contains a single flexible retaining clip 41 while wall 3 includes two rigid clips 31 and 32. Included in the adaptor unit and extending inwardly from the bottom wall 1 are a number of strengthening ridges 24, 25, 26 and 27 as well as cord winding posts 14 and 15, both of which extend vertically from the bottom 1 and facilitate the winding of the telephone line cord around said posts when the telephone is to be used in the vertical mounting mode. Located also in the base wall 1 are two panels 16 and 17 either or both of which may be easily removed by the subscriber to facilitate utilization of the adaptor base with the associated telephone in the vertical mounting mode. Encircling wall 12 extends around most of the perimeter of panel 17 having an opening in one wall through which the line cord may be withdrawn with the wall 12 determining the surrounding area from which the line cord extends from the telephone. The line cord exiting the wall 12 would when utilized on a telephone mounted in the vertical mode, be then wrapped around posts 14 and 15, with the plug extended through the opening left by the removal of panel 16. Wall 11 surrounds opening 28 which when the telephone is in the desk mounted position engages the telephone at that location from which the line cord exits whereby the line cord may be introduced into raceway 13 and from thence extended to the exterior of the telephone adaptor base.

Stud receiving openings 18, 19 and 20 are provided in wall 1 to engage the studs projecting from conventional wall jacks adapted for mounting wall telephones. Such jacks have two studs but such studs may be on different centers. Therefore studs may be introduced into openings 18 and 20 or in the alternative 19 and 20. Once the telephone adaptor base has been located on the studs locking mechanism 21 whose handle extends through opening 42 rotates about a pivot point 22 where it is affixed by means of a locking washer 23 effectively locking the adaptor base and the associated telephone connected thereto to the studs that are included as part of the wall mounting jack for a wall mounted telephone.

Figures 3, 4:
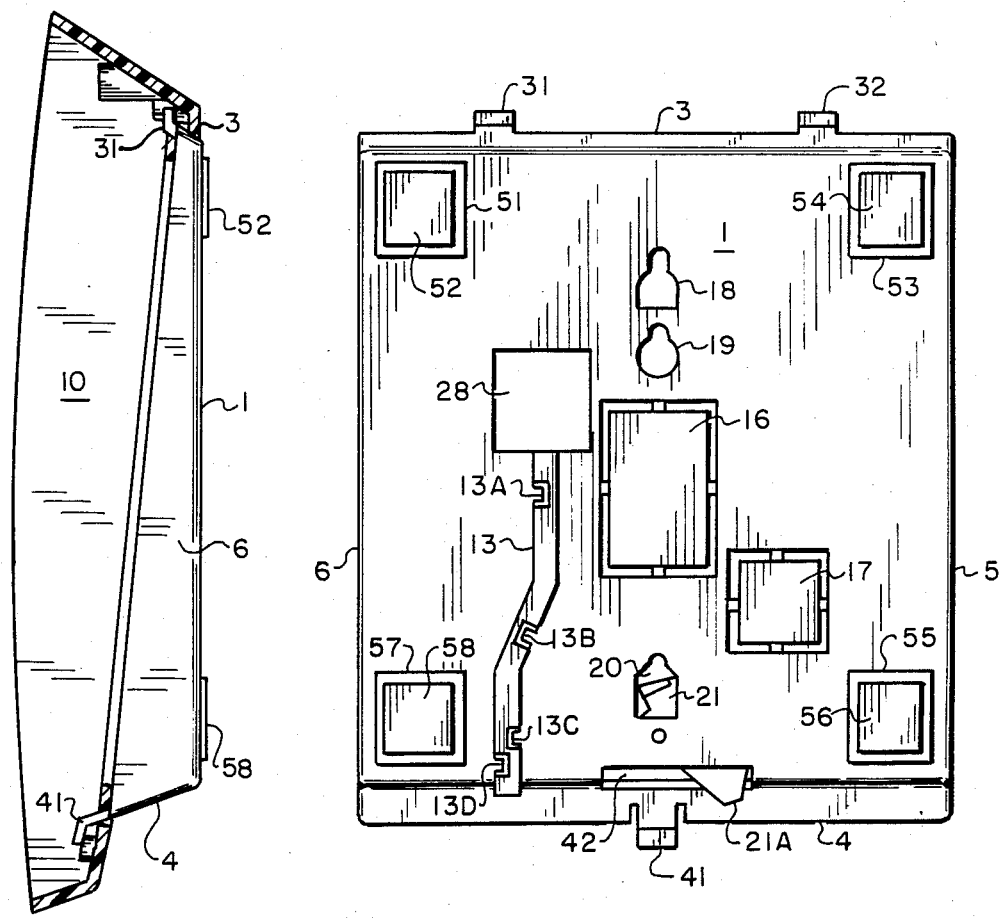
FIG. 3 is a sectional side-view of a telephone adapted to receive the adaptor base of the present invention with said base located thereon in such a manner as to facilitate the vertical mounting of such telephone.
FIG. 4 is a bottom view of the adaptor base of the present invention.

Referring to FIG. 4 the underside of bottom wall 1 of the adaptor unit of the present invention is shown wherein panels 16 and 17 are clearly visible as is opening 28 and raceway 13. Tabs 13A, 13B, 13C and 13D act to retain the telephone line cord within the raceway 13.

As noted above openings 18, 19 and 20 facilitate on the unit on studs the wall mounted jacks and tab 21A projecting through opening 42 facilitates the rotation of locking means 21 to retain the adaptor unit and its associated telephone in a locked position and in the vertical mode.

Also included on the bottom of wall 1 are 4 pad securing areas 51, 53, 55 and 57 to which are secured 5 nonslip pads of rubber or similar material 52, 54, 56 and 58 which are secured to the base in the locations indicated above.

Figure 2:
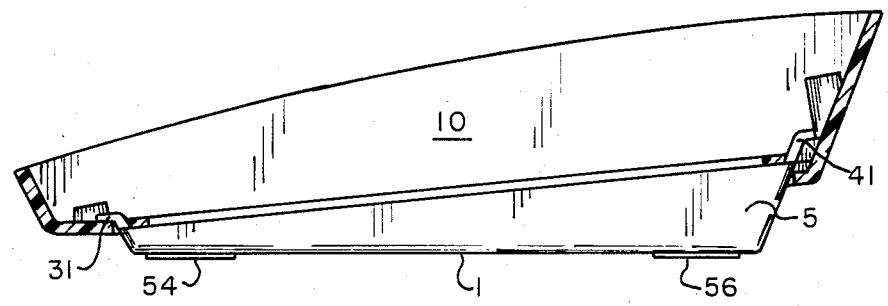
FIG. 2 is a sectional side-view of a telephone adapted to receive the adaptor base in accordance with the present invention and showing such base connected for utilization of the telephone in the desk or horizontal mode.

Referring now to FIG. 2, telephone 10 such as the aforementioned "GAMMA" phone is shown in section with the adaptor base in the present invention so positioned that the telephone can be used as a desk telephone. In the horizontal or desk mode two rigid tabs 31 and 32 (not shown) engage two out of three openings at the bottom of telephone 10 extending in a line near the front portion of the bottom of the telephone while flexible clip 41 is pushed through and engages the center one of three similar openings placed near the rear of the telephone. In the mode shown wall 5 would be visible.

To modify the telephone base 10 for use in a vertically mounted mode, the spring clip 41 would be depressed and thus disengaged from the central opening of the three located near the rear of the telephone after which rigid clips 31 and 32 could also be removed from the openings located near the front of the telephone base 10. The line cord not shown would be moved from the raceway 13 and then wound about support posts 14 and 15, panels 16 and 17 being removed, and the base would then be rotated 180° with the plug end of the line cord extending through the opening created by removal of panel 16 after which rigid clips 31 and 32 would be introduced into two of the three openings located near the back or top of telephone base 10 while the single flexible clip 41 would be introduced into the center one of the three openings located near the bottom or front of telephone base 10. At this time the line cord plug would be connected to the jack included in the wall mounting telephone jack unit of standard configuration and the adaptor studs projecting therefrom would be introduced into openings 20 and either 18 or 19 after which Tab 21A would be rotated about pivot point 22 and lock 21 would then engage the mounting stud extending through opening 20 effectively securing the base of the present invention and telephone connected thereto to the jack unit for a wall mounted telephone, in a vertical position.

While but a single embodiment of the present invention has been shown it will be obvious to those skilled in the art that numerous modifications may be made without departing from the spirit and scope of the present invention and shall be limited only by the scope of the claims appended hereto.

What is claimed is:

1. In combination a telephone instrument unit adapted to be positioned in a horizontal first mode and alternatively positioned in a vertical second mode, said unit including a line cord plug receiving jack and at least a first and a second connector receiving means mounted in a bottom portion of said unit, a line cord including a plug mounted on both ends thereof and an adaptor unit connectible to said bottom portion, said adapter unit comprising: first and second end walls parallel to each other; a first connector included in said first end wall, in said horizontal first mode engaging said first connector receiving means and alternatively in said vertical second mode engaging said second connector receiving means; a second connector included in said second end wall, in said horizontal first mode engaging said second connector receiving means and alternatively in said vertical second mode engaging said first connector receiving means; a first and a second side wall each parallel to each other and each perpendicular to said end walls; and a bottom connected to said end walls and to said side walls and including therein at least a first passageway providing manual access to said line cord plug receiving jack; said bottom also including stud receiving means adapted to engage studs associated with a wall telephone mounting jack whereby said adaptor unit and said telephone unit connectible thereto may be positioned adjacent to said wall mounted jack in a vertical position when said connectors are engaged in said vertical second mode; said bottom further including a second passageway providing manual access to said line cord plug receiving jack when said telephone is mounted in said second vertical mode; said first passageway providing manual access to said line cord plug receiving jack when said instrument is mounted to said adaptor unit in said horizontal first mode; and said adaptor unit bottom still further including therein a plurality of removable sections.

2. The combination as claimed in claim 1 wherein: said first connector is of substantially rigid construction.

3. The combination as claimed in claim 1 wherein: said second connector is of flexible construction.

4. The combination as claimed in claim 1 wherein: there is included in said adaptor unit a raceway connected to said first passageway.

5. The combination as claimed in claim 4 wherein: said raceway includes cord retention means adapted to retain a portion of said line cord within said raceway.

6. The combination as claimed in claim 1 wherein: said stud receiving means comprise a plurality of openings; and each opening includes a keyway associated therewith.

7. The combination as claimed in claim 6, wherein: said plurality of openings include a first and a second opening spaced a first distance apart from each other.

8. The combination as claimed in claim 7, wherein: said plurality of openings include said first and a third opening spaced a second distance apart from each other.

9. The combination as claimed in claim 8 wherein: there is further included a locking means associated with at least one of said openings adapted to engage at least one of said studs associated with said wall telephone mounting jack.

10. The combination as claimed in claim 9 wherein: a portion of said locking means extends thru said adaptor unit whereby said locking means may be manually operated to secure said adaptor to said wall mounting jack.

11. The combination as claimed in claim 1 wherein: there is further included an opening whereby access of said line cord to a wall telephone mounting jack may be effected.

12. The combination as claimed in claim 1 wherein: said adaptor unit bottom includes on an exterior portion thereof a plurality of surface engaging pads of flexible material.

13. The combination as claimed in claim 1 wherein: there is further included excess line cord supporting means comprising a plurality of posts extending away from the bottom of said adaptor unit in a direction toward said telephone instrument unit.

14. A combination as claimed in claim 1 wherein: one of said removable sections is positioned over of said second passageway.

15. A combination as claimed in claim 14 wherein: there is further included a second removable section covering an opening whereby said line cord may be extended to a wall telephone mounting jack.

* * * * *